United States Patent [19]
Marx et al.

[11] Patent Number: 5,138,806
[45] Date of Patent: Aug. 18, 1992

[54] PROTECTION OF WOODEN POSTS AND MASTS

[75] Inventors: Karl-Heinz Marx, Garbsen; Franz Grajewski, Lindhorst, both of Fed. Rep. of Germany

[73] Assignee: Kabelmetal Electro GmbH, Fed. Rep. of Germany

[21] Appl. No.: 532,192

[22] Filed: Jun. 1, 1990

[30] Foreign Application Priority Data

Jun. 2, 1989 [DE] Fed. Rep. of Germany ....... 3918069

[51] Int. Cl.$^5$ .............................................. B32B 31/26
[52] U.S. Cl. ........................................ 52/170; 52/517; 52/728; 156/85; 156/86; 106/18.3; 405/216
[58] Field of Search ...................... 156/85, 86; 52/101, 52/170, 222, 224, 517, 727, 728; 428/907; 405/216; 256/19, 32; 106/18.3; 128/156; 206/440, 441, 484, 813

[56] References Cited

U.S. PATENT DOCUMENTS

| | | | |
|---|---|---|---|
| 712,394 | 10/1902 | Lincoln | 52/170 |
| 1,981,664 | 11/1934 | Quarles | 52/728 |
| 2,955,331 | 10/1960 | Nelson | 128/156 |
| 3,177,667 | 4/1965 | Liddell | 405/216 |
| 3,321,924 | 5/1967 | Liddell | 52/170 |
| 3,448,585 | 6/1969 | Vogelsang | 405/216 |
| 4,236,949 | 12/1980 | Horsma et al. | 156/86 |
| 4,244,156 | 1/1981 | Watts | 52/170 |
| 4,245,931 | 1/1981 | Watts | 156/79 |
| 4,268,329 | 5/1981 | Jervis | 156/86 |
| 4,779,735 | 10/1988 | Kelso | 206/440 |

*Primary Examiner*—Caleb Weston
*Attorney, Agent, or Firm*—R. H. Siegemund

[57] ABSTRACT

A wooden post of mast which has been or is going to be sunk into the ground, is protected particularly in the transition zone between soil and outer atmosphere, by synthetic ribbon shrunken onto the wooden post carrying between it and the wood, upper and lower sealing material for sealing of the ribbon against the wood while in between the sealing material on the side of the strip facing the wood, a paste is included which contains boron or a boron compound; end portions of the strip as wrapped around the wooden post overlap, there being an adhesive strip for bonding and holding the two ends of the ribbon together and against the wood. Also, the connection maintains the sleeve as such after heat shrinking.

5 Claims, 1 Drawing Sheet

U.S. Patent  Aug. 18, 1992  5,138,806
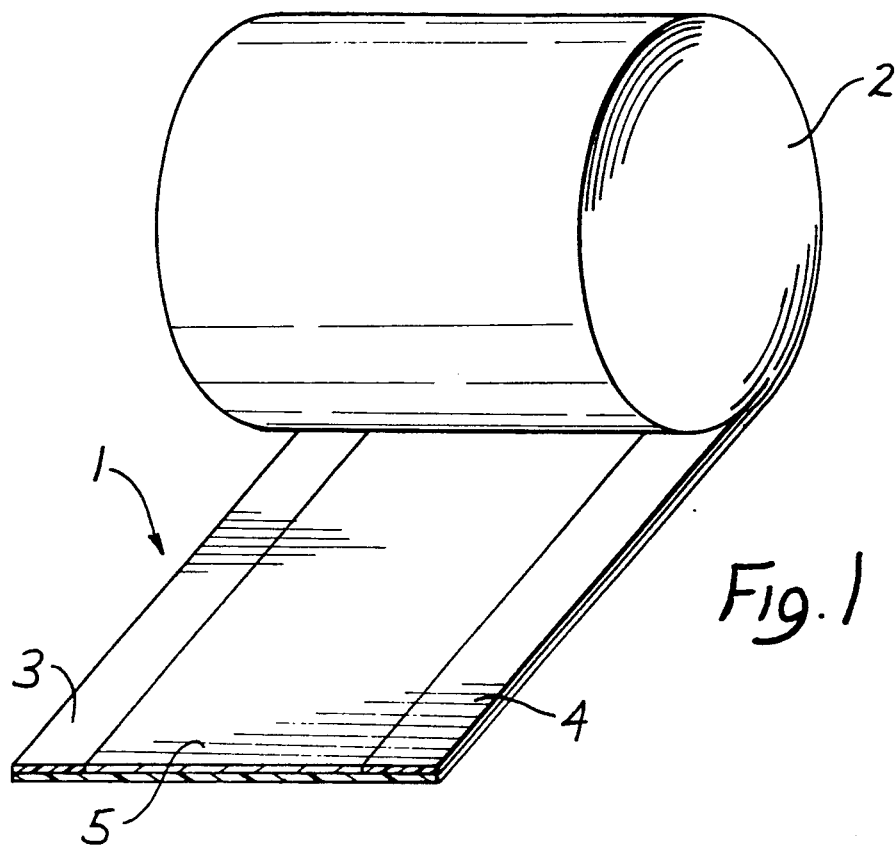
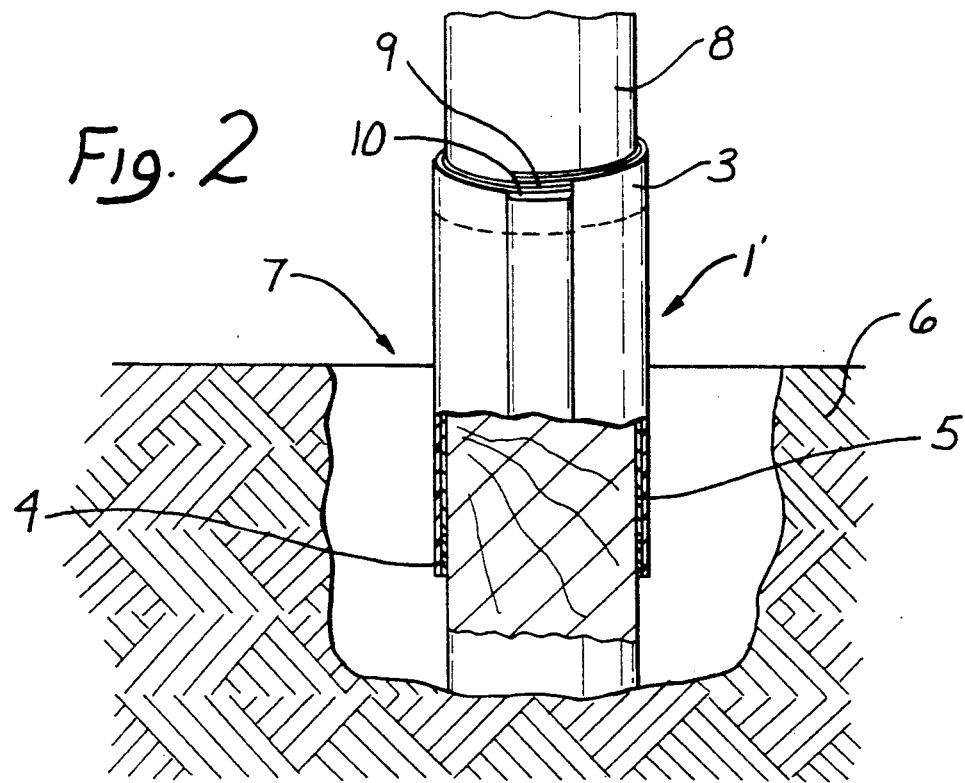

PROTECTION OF WOODEN POSTS AND MASTS

BACKGROUND OF THE INVENTION

The present invention relates to the protection of wooden masts, posts or the like, particularly near the transition area or interface region between soil and air whereby particularly the wooden part is equipped with a jacket, and a protective paste is provided between that jacket and the wood portion.

Wooden posts, masts, towers etc. are sometimes used as carrier for cable either power cable, wires or the like or telephone cable. One of the most common uses of wooden posts is of course as door gates, posts for fences or the like. These posts are prepared by a pressure impregnating procedure in other words prior to sinking the lower part of such a post or mast into ground a wood protection medium is forced in the wood under pressure. There remains however a weak point in the mast namely the transition portion between permanently above ground and permanently below ground. This transition between exposure to soil and atmosphere is basically variable. No matter how much protection one provides throughout the post, well above the ground level, mold, fungus, rotting bacteria will sooner or later develop and attack the wood. Usually the life of the subsoil portion as well as of the wooden parts that is well above ground is often several decades, but the particular transition part has a use life of less that 10 years and depending on the soil conditions the life may drop to 5 years or less.

Attempts have been made to treat this transition zone subsequently with materials that contain boron. It was believed that boron compounds act as fungicide. Basically, this is correct however treating the transition with a liquid medium simply fails sooner or later since the applying of the liquid is really impossible owing to the particular low viscosity these liquids happen to have. It has been tried on the other hand to drill holes into the posts, masts or the like, and to insert rods into the bores which rods contain boron. It was hoped that a long lasting diffusion process causes the boron molecules to migrate from these rods into the wood so that in fact rotting is prevented. Again, this is quite correct and effective but on the other hand there is a disadvantage of this method which is a kind of paradox. As stated the soil/atmosphere portion of a post transition is particularly endangered; on the other hand through the drilling of holes one weakens structurally the post or mast right at that endangered portion.

Other attempts to use impregnating material that contain the effective boron really failed because of weather conditions e.g. rain or snow, spray water etc. which leached the boron out of the wood before it could be effective. In a different approach the German printed patent application 20 43 489 proposes a liquid type cover for impregnated wooden masts in order to cover particularly a protective salt layer that has been applied in the transition zone. This protective salt layer is supposed to protect the wooden mast and post against leaching, rain or other humidity e.g. from wet soil. However, it has to be observed that a really good seal is not available. In order to offset the deficiency just outlined, an impregnating container is provided above the cover which gradually, over a long period of time and automatically yields and issues impregnating material. The cover as per the patent application is established through a shrunken hose which is slipped over the mast and then shrunken on the transition zone. Prior to shrinking heat a resisting sealing material will fill all unevennesses, cracks or the like in the foot portion of the mast or post. The upper end of the shrink hose envelops the impregnating container. Between the shrink hose and the wooden mast or post a certain bandage is provided with impregnating salt or protective salt, paste or the like, and through a separate hose the impregnating container replenishes the active material.

It is quite obvious that this particular arrangement is highly labor intensive, particularly as far as installation is concerned. The entire arrangement has to be put into operation when the post or mast is installed. On the other hand the head part of the cover or the head end thereof can be seen only with difficulty so that ultimately in the case of heavy rains the impregnated material is diluted and sooner or later the protecting boron will be leached out of the wood. The impregnating containers are somehow provided for projection from the surface of the post and that inherently makes them prone to mechanical damage. In the case of roads, and if the mast or post is close to road, the projecting impregnating container may easily lead to injuries and is thus undesirable from any point of view.

DESCRIPTION OF THE INVENTION

It is an object of the present invention to provide a new and improved protection for wooden posts, masts or the like, using whatever technology has been developed in the past but providing improvements to simplify drastically the installation and manufacture of the operation particularly right at the site avoiding subsequent leaching out of the protecting substance; and permitting retrofitting of already existing and installed posts.

It is a specific object to provide a new and improved protection for wooden masts or posts which on one hand uses impregnating material while the arrangement is to be protected against dilution and leaching through rain water, spray water, subterranean water and etc. so that the effectiveness of the impregnating material is well extended over past practice.

It is still another object to provide a new and improved protection of wooden masts even if the mast is high and in such a manner that existing masts can be retrofitted.

In accordance with the preferred embodiment of the present invention it is suggested to provide a synthetic ribbon carrying on and along its longitudinal edges a sealing paste, a paste is provided on the ribbon in between these strips of sealing paste, this additional paste contains boron or its compounds; this ribbon is wrapped around a wooden mast or post covered with an adhesive strip. Subsequently, the ribbon is heat shrunk as a jacket onto the mast.

The utilization of ribbon and wrapping the ribbon around the post makes it apparent that the invention is well suited for retrofitting existing posts. One does not even need much of any preparation since the ribbon or strip as a whole is self contained and includes as a composite striplike layer which includes everything that is needed; namely sealing and effective wood protection and impregnation. The sealing material along the ribbon edges will be usually because plastic and liquified whenever the applied ribbon is heated to obtain the shrinking. This means that the sealing material easily penetrates in the more or less rough surface of the post or mast and once solidified two separate partially embedded sealing strips are provided. They seal the upper and lower edges of the ribbon as applied so that particularly the impregnating material which contains the boron in between is protected against leaching. The as stated effective material contains boron or compounds and it was found that relatively small amounts of boron suffice to prevent rotting of the wood. The wood always contains moisture to some extent, and that serves readily as a desirable leaching agent to separate the boron from the paste and through diffusion with water acting as carrier, the boron is more or less uniformly distributed throughout the mast or critical region.

The shrinking on of the ribbon renders effective certain forces and in order to take up these forces the ribbon is looped around with overlapping ends. This end overlap is then affixed through adhesive strip having a length which is at least as long as the synthetic ribbon is wide. The adhesive strip carries a hot melt adhesive and is fastened to beginning and end of the ribbon prior to the shrinking process. Here one applies just a little bit pressure and heat. The heat and pressure suffices to obtain some local shrinking and after the heating and adhering, the hot melt bonding agent solidifies again. Now the remaining part of the synthetic strip is heated for shrinking. The paste which is hard and brittle or can become hard and brittle at low temperatures when dry or both particularly during long storage times, may require to be moistened or to be carefully heated a little and carefully in order to render it sufficiently plastic so that one can move around the wooden post; but without invoking the shrinking!

In accordance with the particularly advantageous configuration of practicing the invention it was found that the width of the synthetic ribbon should be at least 25 cm and the paste like cover should cover at least half of the width of the strip. As stated, the presence of moisture causes the boron or boron compound to diffuse and that diffusion is of course not restricted to a radial inward direction, but takes place also longitudinally in the mast or post. This overall diffusion aspect is beneficial so that in fact a width of the strip of 25 mm suffices. Considering the process underlying the invention protecting wooden masts in the respective transition zone from soil or outer atmosphere by means of the shrinking part and protective paste uses a method that is characterized by applying a heat shrinkable synthetic ribbon i.e. wrapping it around the wooden mast, particularly in the transition zone which ribbon has along its longitudinal edges a layering with a sealing paste and in between there is a coating that contains boron or a boron compound containing posts. That ribbon is now wrapped around the post and its ends overlap following which an adhesive strip is applied to connect the ends of the ribbon to each other; this way one makes a sleeve or jacket. Heat is now applied to shrink this resulting synthetic strip onto the wooden mast or post. This way the active ingredients are forced into crevices of the wood (a) to impregnate it with the protective agent and (b) to form two sealing rings which are intimately connected to the wood.

In practicing the invention economically the strip may come in a wound configuration and certain lengths are paid off the spool, wrapped around the wooden mast or post cut and heated a little bit at the end to apply the adhesive strip following which shrinking obtains. Here then the shrinking provides squeezing the sealing paste into cavities, cracks, crevices etc of the wood to thereby produce two more or less integrated sealing rings. In between the sealing rings is held the boron containing paste. The shrinking process that requires the application of heat renders the paste more fluid which will then also enter all adjoining cavities, cracks, etc. of the wood covering the wood completely on one hand and beginning a diffusion process into the interior of the wood on the other hand.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a perspective of strip material used for practicing a preferred embodiment of the present invention in accordance with the best more configuration; and FIG. 2 illustrates somewhat schematically a post together with a protection obtained in accordance with the invention.

Proceeding now to the detailed description of the drawings, FIG. 1 illustrates a synthetic material ribbon 1 shown in perspective view and wound as a roll 2. The ribbon or strip 1 is practically made of a cross-linked polyethylene. That polyethylene is made in the usual fashion but following cross linking it was heated to a temperature above the melting point and stretched by about 25% of its length and cooled in the stretched state. The stretched state, therefore, was and is maintained and the strip as it is shown is in a stably stretched state. In fact such a kind of strip or ribbon is available on the market. The thickness is about 1 to 2 mm.

Now the strip shows, in addition and along its longitudinal edges, two strips 3 and 4 of a long lasting plastic material for example a sealing material on the basis of polyisobutelene. The width of each strip 3,4 is not more than 25% of the width of the strip or ribbon 1 as a whole in the drawing it is a little less. That means the strips 3 and 4 will cover not more than half of the width of the ribbon.

Reference numeral 5 refers to a layer which is in between the two strips 3 and 4 and has about the same thickness and contains boron or a boron compound. The layer 5 is basically a paste which firmly adheres to the synthetic ribbon 1. Originally the ribbon or strip 1 is uncoated and the strips 3,4 and 5 are preferably applied to the carrier ribbon 1 in a continuous process. The coating process may not be directly a coating process but instead the strip 3 and 4 may be individual strips which are separately supplied and in a suitable layer or laminating machine the carrier 1 and the strip 3 and 4 are combined.

The ribbon as illustrated is well suited to cover the transition region 7 between soil 6 on one hand and the atmosphere on the other hand, of a wooden post, mast or the like. This post is of any kind and purpose, being for example a post for power lines or telephone wires or other transmission lines or pertaining to wooden fence or it is a post separating pasture from fields, roads or the like.

The purpose of such a wooden post is not important but it is decisive that often wooden posts such as 8 are used under conditions which are prone to producing rotting. For protection of this post particular length of ribbon is separated from the roll 2, cut at a length to be a little longer than the circumference and periphery dimension of the post 8. This ribbon or strip portion 1' is then wrapped around the post as illustrated so that the ends 9 now overlap. The overlapping ends 9 are covered with an adhesive strip 10. The strip 10 is also a synthetic strip carrying a coating of a suitable hot melt adhesive. In order to provide this adhesion the end region 9 as well as the strip 10 are heated and then the strip 10 is pressed against the overlapping end portion 9 of the ribbon 1'.

Having affixed the strip in form of a sleeve or jacket being created thereby, the entire strip 1' is heated and now shrinking obtains of this sleeve against the wooden post 8. The heating of course causes also heating of the strips 3 and 4 as well as of the paste 5. As far as the sealing strips 3 and 4 are concerned the heated sealing material will penetrate into any crevice, cavities, open pores of the wood underneath and thereby really provide a solid sealing function. Following cooling sealing rings have now been obtained and are in a near integrating fashion combined with the wood and will in fact prevent moisture from entering. The critical transition of the mast or post 8.

The boron or boron compound of layer 5 is water soluble and there is always some residual moisture in the post or mast 8 that moisture usually suffices to liberate boron ions from the paste which then can diffuse through the transition zone or post 8 in order to lastingly protect the wood against rotting. In addition of course fairly strong ribbon 1 provides as a side effect mechanical protection of the covered area.

The invention is not limited to the embodiments described above but all changes and modifications thereof, not constituting departures from the spirit and scope of the invention, are intended to be included.

We claim:

1. A wooden post which has or is to be sunken into the ground, and requiring a protection in the transition zone between soil and outer atmosphere, said protection comprising:
    a synthetic ribbon wrapped around and heat shrunken onto the wooden post carrying between it and the wood;
    upper and lower sealing material along circumferential edges of the ribbon as wrapped around the post and on the side of the ribbon facing the wood, for sealing of the ribbon against the wood while in between the sealing material, also on the side of the ribbon facing the wood, a paste is included which contains boron or a boron compound; and
    end portions of the ribbon as wrapped around the wooden post overlap, there being an adhesive strip for bonding and holding the two ends of the ribbon together, so that the paste is sealed except for contact with the wood and moisture in the wood.

2. Post as in claim 1, the ribbon having a width of at least 25 cm.

3. Post as in claim 1, wherein the sealing material on the ribbon have a combined width which does not exceed 50% of the width of the ribbon.

4. Method of protecting a wooden post in its transition zone between ground and outer atmosphere against rotting comprising the steps of
    providing a strip of a synthetic heat shrinkable material having along its edges sealing strips and in between there is a paste containing boron or a boron compound;
    applying said ribbon to said transition zone with the strips and the paste facing the wood;
    affixing the ends of the wrapped around ribbon to each other to complete a sleeve; and
    heat shrinking the resulting sleeve onto the wooden post thereby causing in addition the sealing strips to become temporarily soft to obtain intimate sealing of the strip against the wood while causing the paste to begin to penetrate into any crevices of the wooden post.

5. A wooden post which has or is to be sunken into the ground, and requiring a protection in the transition zone between soil and outer atmosphere, said protection comprising:
    a synthetic ribbon wrapped around and heat shrunken onto the wooden post carrying between it and the wood;
    upper and lower sealing material along circumferential edges of the ribbon as wrapped around the post and on the side facing the wood, the material having melted during said heat shrinking, for sealing of the ribbon against the wood while in between the sealing material, also on the side of the ribbon facing the wood, a paste is included which contains boron or a boron compound; and
    end portions of the ribbon as wrapped around the wooden post overlap, there being an adhesive strip for bonding and holding the two ends of the ribbon together, so that the paste is sealed except for contact with the wood and moisture in the wood.

* * * * *